United States Patent [19]
Hoblingre

[11] Patent Number: 5,584,211
[45] Date of Patent: Dec. 17, 1996

[54] STEERING COLUMN ASSEMBLY, ESPECIALLY FOR A MOTOR VEHICLE

[75] Inventor: Andre Hoblingre, Valentigney, France

[73] Assignee: Ecia-Equipements et Composants Pour l'Industrie Automobile, Audincourt, France

[21] Appl. No.: 348,804

[22] Filed: Nov. 28, 1994

[30] Foreign Application Priority Data

Nov. 30, 1993 [FR] France .................................. 9314332

[51] Int. Cl.⁶ .................................................. B62D 1/16
[52] U.S. Cl. ............................ 74/492; 280/779; 403/12; 24/295
[58] Field of Search .............................. 74/492; 280/779, 280/780; 180/78; 403/11, 12; 29/464, 466; 24/293, 295

[56] References Cited

U.S. PATENT DOCUMENTS

| | | | |
|---|---|---|---|
| 3,621,732 | 11/1971 | Kaniut | 74/492 |
| 4,703,669 | 11/1987 | Hyodo | 74/492 |
| 5,056,818 | 10/1991 | Sadakata | 280/780 X |
| 5,127,670 | 7/1992 | Hoblingre et al. | 280/779 |

FOREIGN PATENT DOCUMENTS 444996  9/1991  European Pat. Off. .

*Primary Examiner*—Vinh T. Luong
*Assistant Examiner*—Troy Grabow
*Attorney, Agent, or Firm*—Sughrue, Mion, Zinn, Macpeak & Seas

[57] ABSTRACT

This steering column assembly especially for a motor vehicle, of the type including, at least at one of its ends, means for screw-fastening to the rest of the structure of the vehicle, is characterized in that it includes means (5) for centring and for hooking onto the rest of the structure of the vehicle, in order to facilitate the fitting of the screwing means and of the assembly to the rest of the structure of the vehicle.

4 Claims, 1 Drawing Sheet

I'm 5,584,211

STEERING COLUMN ASSEMBLY, ESPECIALLY FOR A MOTOR VEHICLE

BACKGROUND OF THE INVENTION

The present invention relates to a steering column assembly, especially for a motor vehicle.

In the majority of cases, these steering column assemblies are fastened to the rest of the structure of motor vehicles, and more particularly under the dashboard of the latter using screwing means.

Thus, for example, in the state of the art there are known steering column assemblies which include, close to each of their ends, assembly fittings provided with holes for the passage of screws or studs which are intended to receive nuts, allowing these assemblies to be fastened to the rest of the structure of the vehicle.

There are also known in the state of the art e.g., U.S. Pat. No. 5,127,670—Hoblingre et al) steering column assemblies which include, close to one of their ends, hooking means designed to interact with complementary means of the vehicle, while at the other end these assemblies have assembly fittings provided with holes for the passage of clamping means allowing these assemblies to be mounted with restraint on the rest of the structure of the vehicle.

However, all these assemblies have a certain number of drawbacks, especially where their fitting is concerned.

Indeed, all these assemblies are fitted in the following way:

1) installation of the column assembly by an operator;
2) engagement of the screwing means;
3) installation of a jig for centring the assembly; and
4) final clamping of the assembly onto the rest of the structure of the vehicle using the corresponding screwing means.

It can be understood that these various operations are relatively difficult for one and the same operator to achieve, which results in a relative long assembly time.

SUMMARY OF THE INVENTION

The object of the invention is therefore to solve these problems by proposing a steering column assembly which is simple, reliable and easy to fit onto the rest of the structure of the vehicle.

To this end, the subject of the invention is a steering column assembly especially for a motor vehicle equipped, at least at one of its ends, with means for screw-fastening to the rest of the structure of the vehicle, characterized in that it includes means for centring and for hooking onto the rest of the structure of the vehicle, in order to facilitate the fitting of the screwing means and of the assembly to the rest of the structure of the vehicle.

Advantageously, the centring and hooking means comprise at least one hook-shaped lug of one of the elements, column assembly or rest of the structure of the vehicle, and designed to engage elastically in a corresponding recess in the other element, rest of the structure of the vehicle or column assembly.

The invention will be better understood from reading the description which will follow, given solely by way of example and made with reference to the appended drawing in which:

DESCRIPTION OF THE PREFERRED EMBODIMENTS

Figure 1:
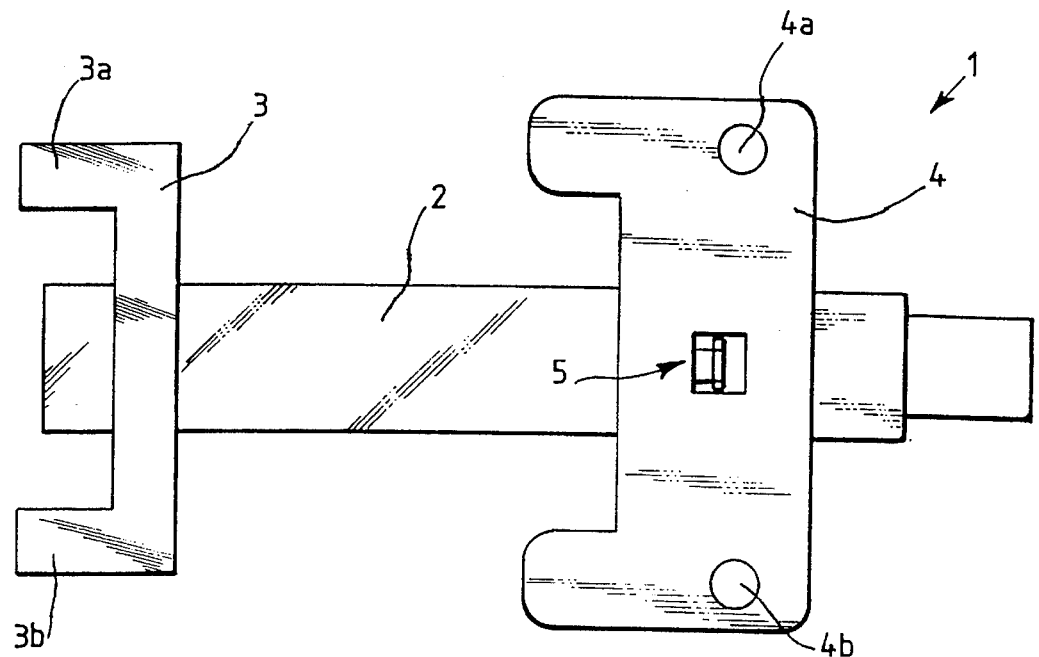
FIG. 1 represents a plan view of one embodiment of a steering column assembly according to the invention.

As can be seen in FIG. 1, a steering column assembly according to the invention, denoted by the general reference 1, includes, in the conventional way, a column body 2 in which is located a steering column shaft one end of which is designed to receive a steering wheel, and the other end of which is designed to be connected to the rest of the steering gear of the vehicle.

The body 2 includes, for example, close to its ends, assembly fittings 3 and 4 designed to allow this assembly to be fastened to the rest of the structure of the vehicle.

In the embodiment represented, one of these fittings, for example 3, includes members in the form of hooking tabs 3a and 3b designed to engage in hooks integral with the structure of the vehicle while the other fitting, for example 4, includes holes 4a, 4b for the passage of means for screw-clamping the assembly onto the vehicle.

Indeed it can be understood that these holes allow the passage of screws or studs in order to allow this assembly to be fastened under restraint to the rest of the structure of the vehicle.

It can be understood that the fitting of this assembly onto the rest of the structure of the vehicle is not easy in so far as the assembly operator has first of all to engage the hooking tabs 3a and 3b into the complementary means of the rest of the structure of the vehicle, then hold the column assembly in position to allow the engagement of the screwing means.

Once this engagement has been achieved, it is necessary to install a centring jig before carrying out complete tightening of the screwing means in order to obtain the permanent fastening of the assembly to the rest of the structure of the vehicle.

In order to solve these assembly problems, there are provided in the steering column assembly according to the invention, means for centring and additionally hooking the column assembly onto the rest of the structure of the vehicle in order to facilitate the fitting of the screwing means and of this assembly.

These means are denoted by the general reference 5 in FIG. 1 and located, for example, close to one of the ends of the column assembly, in the region of the assembly fitting 4.

Figures 2, 3:
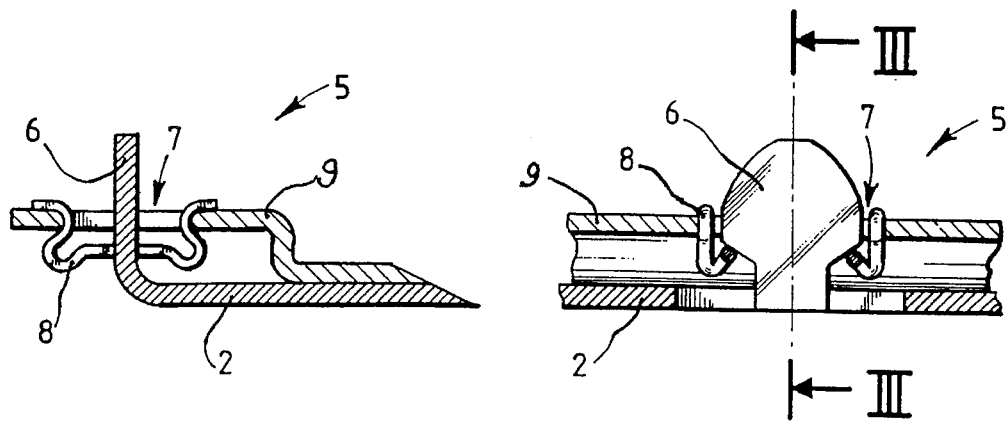
FIG. 2 represents a partial view of one embodiment of centring and hooking means falling into the makeup of a steering column assembly according to the invention.
FIG. 3 represents a sectional view on the line III—III of FIG. 2.

These centring and hooking means comprise, for example, as can be seen in FIGS. 2 and 3, at least one lug in the form of a hook 6 connected to the steering column assembly and more particularly to the body 2 of the latter and which is designed to engage elastically in a recess 7 in the rest of the structure 9 of the vehicle.

Indeed, an elastic member such as an elastic clip 8 for example, is located in this recess in order to ensure elastic hooking and centring of the assembly relative to the rest of the structure of the vehicle.

It can therefore be understood that when the operator has engaged the hooking means 3a, 3b of the fitting 3 in the complementary means of the rest of the structure of the vehicle, and the hook-shaped lug 6 in the corresponding recess 7 in the structure 9 of the vehicle, the column assembly is held in a centred position on the rest of the structure so that the operator has a great freedom of movement for the engagement and final screwing of the means for clamping the assembly to the rest of the structure 9 of the vehicle.

Of course it goes without saying that various embodiments of these centring and hooking means may be envisaged.

Thus for example, the hook-shaped lug may equally well be integral with the rest of the structure of the vehicle and be designed to engage in a recess in the column assembly.

Likewise, this hook-shaped lug may be in the form of an elastically deformable hook and include elastically deformable branches for its elastic engagement in the corresponding recess.

Of course, the hooking and centring means may be located at a different position on the steering column assembly from the one described in relation to the FIG. 1.

Thus for example, these centring and hooking means may include a hook-shaped element at each of the ends of the column assembly in the case where the fittings for fitting this assembly to the rest of the structure of the vehicle include through-holes designed to interact with screwing means at each of its ends.

What is claimed is:

1. In a steering column assembly for a motor vehicle, said assembly having, at opposite first and second ends thereof, respective first (3) and second (5) fastening means for fastening said assembly to bodywork of the vehicle, the improvement wherein said second fastening means (5) comprises: means for screw-fastening said assembly to the bodywork; and means the centering and for hooking said assembly onto the bodywork of the vehicle, in order to facilitate fitting of the screw-fastening means and of the assembly to the bodywork of the vehicle.

2. The assembly according to claim 1, wherein the centering and hooking means comprise at least one hook-shaped lug (6) which is integral with the column assembly (1) or the bodywork of the vehicle, and which is designed to engage elastically in a corresponding recess (7) in the bodywork of the vehicle or the column assembly, respectively.

3. The assembly according to claim 2, further comprising an elastic member (8) located in the recess (7).

4. The assembly according to claim 2, wherein said lug is an elastically deformable hook.

* * * * *